Sept. 10, 1935.    L. B. WINTON    2,013,678
MEANS FOR FILLING MATERIAL INTO RECEPTACLES
Filed Feb. 24, 1933    5 Sheets-Sheet 1

Inventor
L. B. Winton
By John O. Seifert
Attorney

Sept. 10, 1935.  L. B. WINTON  2,013,678
MEANS FOR FILLING MATERIAL INTO RECEPTACLES
Filed Feb. 24, 1933  5 Sheets-Sheet 2

Inventor
L. B. Winton,
By John O. Seifert
Attorney

Sept. 10, 1935.  L. B. WINTON  2,013,678
MEANS FOR FILLING MATERIAL INTO RECEPTACLES
Filed Feb. 24, 1933  5 Sheets-Sheet 4

Inventor
L. B. Winton
By John O. Seifert
Attorney

Patented Sept. 10, 1935

2,013,678

UNITED STATES PATENT OFFICE 2,013,678

MEANS FOR FILLING MATERIAL INTO RECEPTACLES

Lewis B. Winton, Greenwich, Conn., assignor to American Sealcone Corporation, New York, N. Y., a corporation of New York Application February 24, 1933, Serial No. 658,364

31 Claims. (Cl. 226—106)

This invention relates to receptacle filling apparatus embodying a tank for the material to be filled into receptacles and having a connection with a source of supply with means operative through the quantity of material in the tank to control said connection of the tank with the source of supply to maintain a predetermined quantity of the material in the tank, and wherein the material is delivered from the tank in successive predetermined quantities equal to the volumetric capacity of the receptacles to be filled with the material from the tank and effected by the delivery of the material from the tank to a measuring device in the form of a cup or receptacle member of predetermined capacity extended upward from the bottom of the tank having an inlet opening above the level of the material therein, and said measuring device having an outlet exterior of the tank through which to discharge the material filled into the measuring device into a receptacle on a support relative thereto, the filling of the measuring device being effected by mechanically operative means to displace the material in the tank and cause the level of the material to rise above the inlet opening to the measuring device and the filling of the material thereinto.

It is the primary object of the invention to provide in receptacle filling means of this character an improved method of and means for effecting the raising of the level of the material in the tank to fill the material from the tank into a measuring device.

It is the principal object of the invention to provide in receptacle filling apparatus of this character intermittently operative pressure varying means to raise the level of the material in the tank and the filling of a measuring device successively with the material from the tank.

It is another object of the invention to provide in receptacle filling apparatus of this character a hood or bell to engage over the measuring device in the tank with the opening to the bell opening to or immersed in the material in the tank, and the provision of means connected with the bell to create a vacuum in the bell and thereby cause the raising of the material in the bell above the inlet opening to the measuring device and the filling of the same with the material, with means in the connection of the vacuum creating means with the bell intermittently operative to alternately connect the vacuum creating means with the bell and the vacuum creating means and bell with the atmosphere.

A further object of the invention relates to the provision of valve mechanism for the outlet of the measuring device normally urged to position to close the outlet of the measuring device, and intermittently operative means to actuate the valve mechanism in alternate timed sequence with the pressure varying means to deliver or discharge the material from the measuring device to a receptacle having a volumetric capacity to receive the material of the measuring device.

It is another object of the invention to provide in receptacle filling apparatus of this character a series of measuring devices and effect the filling of the same with material from the tank in which they are arranged by a variation in pressure and each measuring device having an outlet normally closed by a valve, and the provision of means to actuate the valves to outlet opening position embodying means to render the valve actuating means of a valve of a measuring device operative to move the valve to outlet opening position by a receptacle positioned relative to the outlet of such measuring device and maintain said valve actuating means inoperative to move a valve of an outlet of a measuring device to outlet opening position relative to which no receptacle is positioned.

In the drawings accompanying and forming a part of this application

Figure 7 is a perspective detail view of the float actuated valve for controlling the connection between the tank and source of supply.

Figure 17 is a side elevation of the valve mechanism of the outlet of the measuring device and actuating means therefor, and showing modified means for controlling the actuation of the valve mechanism by a receptacle positioned relative to the outlet of the measuring device.

Figure 18 is an end elevation looking at the right of Figure 17.

Figure 19 is a plan view of the valve actuating means and the means for controlling the operation thereof to actuate the valve to outlet opening position shown in Figure 17.

Figure 20 is a perspective view of the means controlled by a receptacle shown in Figures 17 to 19 for rendering the valve actuating means operative to move the valve to outlet opening position.

Figure 21 is a side elevation, and Figure 22 is a fragmentary view, of parts of the means shown in Figures 17 to 20 controlled by a receptacle for rendering the valve actuating means operative to actuate the valve to outlet opening position, and Figure 23 is a cross sectional view of a modified arrangement of tank with a measuring device and means to control the discharge of material from the tank together with means for increasing the pressure in the tank to effect a raising of the liquid of the material in the tank above the inlet to and the filling of the same into a measuring device.

In the method and means for carrying out the invention the apparatus is adapted for the filling of liquid, such as milk, into receptacles R, shown as of truncated conical form and having the mouth or filler opening at the end of smaller diameter.

Figure 1:
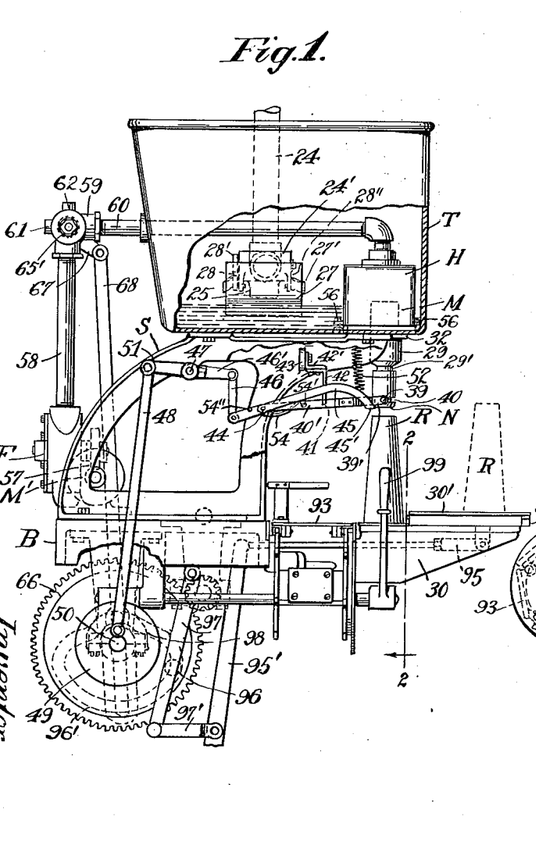
Figure 1 is an end elevation of receptacle filling apparatus illustrating an embodiment of the invention and showing the material carrying tank partly in section.
Figure 2:
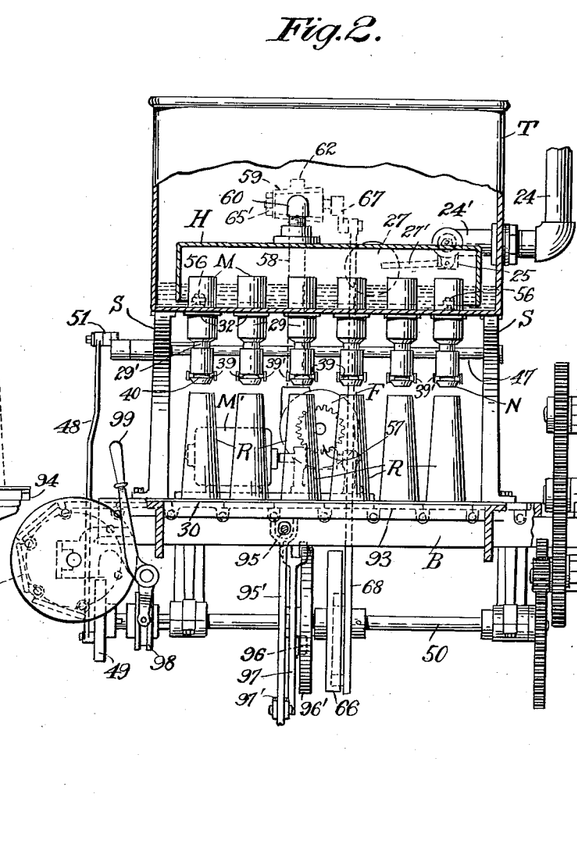
Figure 2 is a front elevation with part of the framework and material carrying tank in section.
Figures 3, 4, 5, 6:
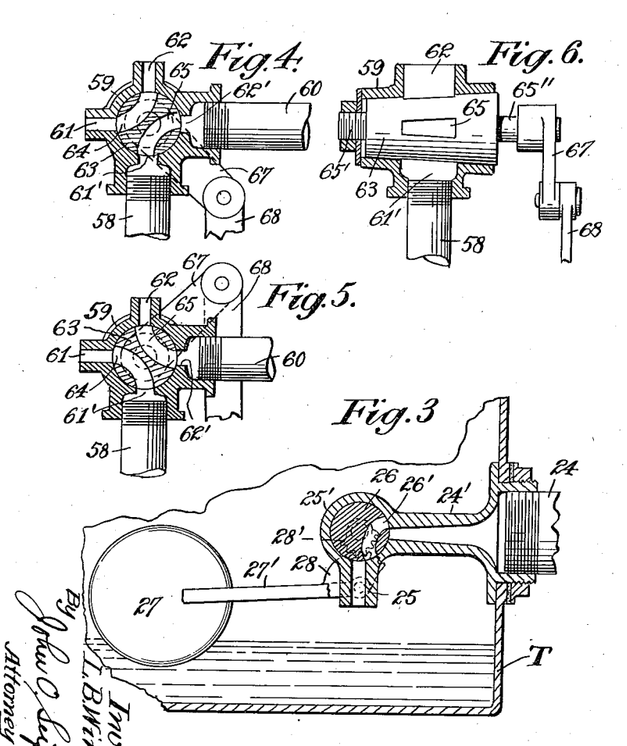
Figure 3 is a sectional detail view showing float actuated valve mechanism for controlling a connection of the tank with a source of supply to maintain the material at a predetermined level in the tank.
Figures 4 and 5 are cross sectional views of valve mechanism for connecting vacuum creating means with a measuring device and closing the bell and to connect said bell and the vacuum creating means alternately with the atmosphere.
Figure 6 is a side elevation of the valve mechanism shown in Figures 4 and 5 and showing the valve casing in section.

In the embodiment of the invention shown in Figures 1 to 9, inclusive, there is provided a tank T to contain the material to be filled into receptacles, the tank being supported by standards S in superposed and spaced relation to a bed B of a supporting frame, and connected with a source of supply (not shown) by a pipe 24 connected with a pipe 24' secured in an opening in the side wall of and extending into the tank. The connection of the tank with the source of supply is automatically controlled by the quantity of material in the tank to maintain the level of the material, in the present instance, liquid, at a predetermined level in the tank. For this purpose the outlet end of the pipe 24' is arranged at a right angle and supported at one right angle portion in the tank and having the outlet into the tank from the other angle portion which is extended in a direction toward and opens to the bottom of the tank, as shown in detail at 25 in Figure 3, and arranged with a valve chamber 25' at the juncture of the angle portions in which there is rotatably mounted a valve plug 26 having a port 26' transversely therethrough adapted to be placed in register with the openings through the pipe portions 25 and 24' to connect the tank with the source of supply through pipe 24 and to shut off said connection, as shown in Figure 3. The operation of the valve is controlled to maintain the liquid at a predetermined level in the tank by a float 27 carried by arms 27', one arm being extended from a toothed sector 28 pivotally mounted on the side of the pipe extension 25 meshing with the teeth of a sector 28' rotatable with the valve plug, and the other arm 27' pivotally supported by an arm 28" fixed to the valve chamber 25'.

Figures 8, 9:
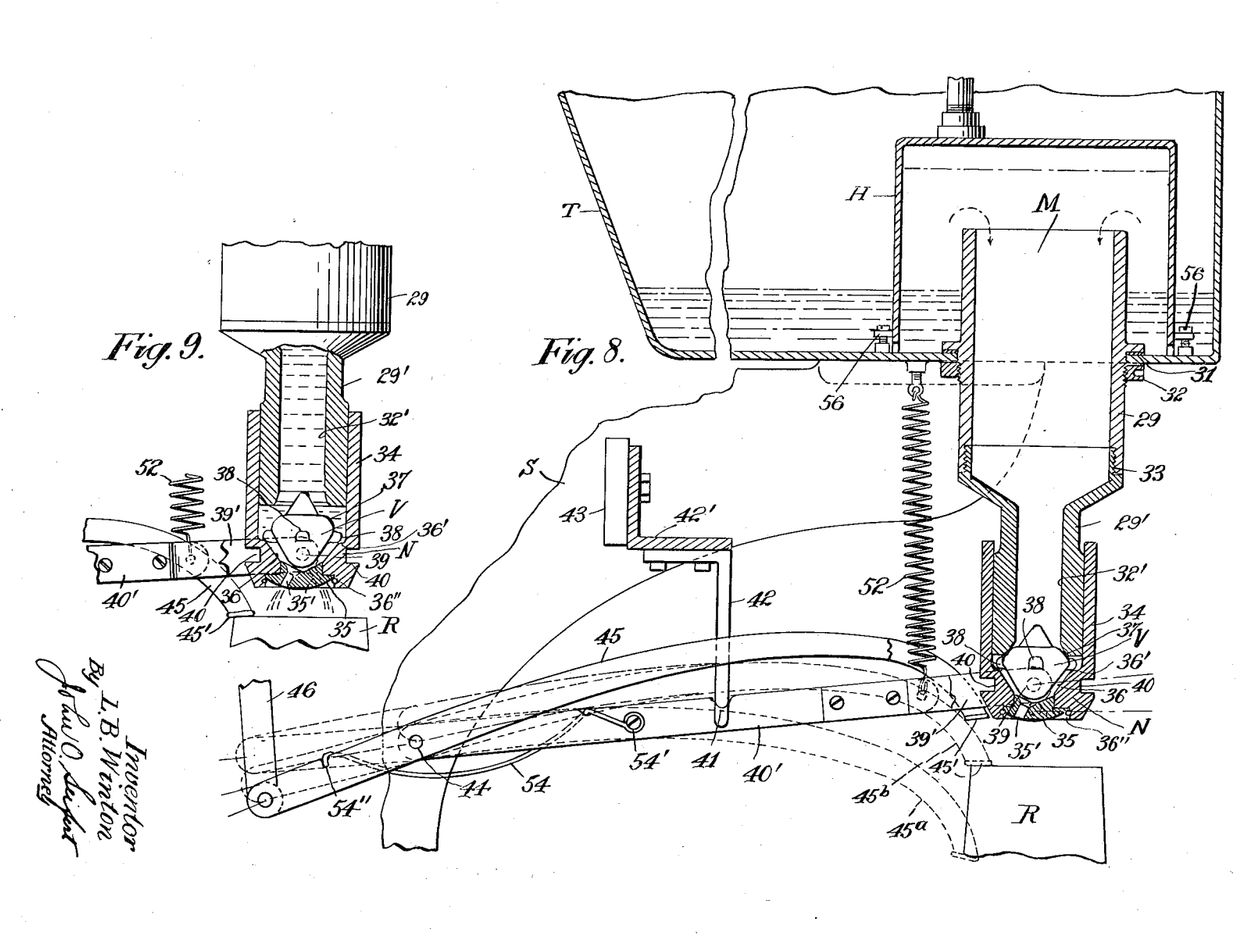
Figure 8 is an enlarged sectional view of a portion of the tank and a measuring device and showing the relation of the enclosing bell therefor, the valve mechanism for the outlet of the measuring device showing the same in outlet closing position, and the means controlled by a receptacle positioned relative to the outlet of the measuring device to actuate the valve to outlet opening position and discharge of the material from the measuring device to the receptacle.
Figure 9 is a sectional view of the portion of the measuring device with the outlet arranged with the valve mechanism shown in Figure 8 and showing the same actuated to outlet opening position.

The liquid is delivered from the tank and filled into the receptacles R in successive predetermined measured quantities, for which purpose there is provided a measuring device M, or a series of such devices, in the present instance shown as six in number, each in the form of a cup member comprising, as shown in detail in Figure 8, a tubular section 29 extended through openings in a portion of the bottom of the tank overhanging a fixed receptacle supporting shelf 30 extended laterally from the bed B, with a portion of said tubular member extending upward into and opening to the tank above the normal level of the liquid therein. The member 29 has an annular flange to seat upon the wall about the opening in the tank through which it extends with an interposed packing, as at 31, and is clamped thereto by a ring 32 threaded onto the exterior of said tubular member and adapted to abut the outer surface of the tank, the ring having sockets therein for the application of a pin wrench.

Each tubular member has a restricted outlet to the exterior of the tank through the portion extended from the bottom of the tank, and while this outlet may be through an integral part of the tubular member the outlet is provided in a separate member 29' having a portion at one end of a diameter to correspond with the diameter of the tubular member 29 and removably secured thereto, as by a screw threaded connection 33, whereby said member may be readily removed for cleaning purposes. The outlet is through an elongated portion 32' of reduced diameter.

The delivery or discharge of the liquid from the measuring devices is through a nozzle N and controlled by a valve V carried by said nozzle. Each nozzle comprises a tubular member having a sleeve portion 34 at one end whereby it is slidably mounted on the reduced portion 32' of the outlet member and having an opening of reduced diameter at the opposite end having a nozzle head 35 mounted therein having discharge ports or orifices 35' therethrough inclining or diverging outward from the axis of the tubular member, the wall within the sleeve portion diverging from the nozzle head engaging opening toward the sleeve portion 34, as at 36, and merging with an annular seat or shoulder 36'. The nozzle head is retained in position in its carrying member 34 by a split ring engaging an arcuate recess in the wall of an enlargement of the nozzle head engaging opening and engaging over a flange of the nozzle head engaging in said enlargement, as shown at 36''. The valve V is carried within the nozzle member 34 in interposed relation to the end wall of the outlet portion of the measuring device and the inclined wall 36 of the said nozzle member, the valve having an intermediate globular portion adapted to engage or seat against a correspondingly formed seat in the end wall of the outlet portion 32', as at 37, with portions of conical form extending oppositely from said globular portion, one of said conical projecting portions extending into the outlet and the other in opposed relation to the diverging wall 36, the valve being supported on the shoulder 36' in spaced relation to said wall 36 to permit of the passage of the liquid between said wall and the valve to the nozzle orifices by lugs 38 extending diametrically opposite from the valve intermediate the conical portions and engaging upon the shoulder 36'.

The nozzle member is supported by pins 39 extending inward from the legs of a bifurcated member 39' embracing opposite sides of the nozzle member engaging an annular recess 40 in the nozzle member, said bifurcated member being carried at the end of a lever 40' fulcrumed, as at 41, intermediate the ends on a fulcrum bar 42 fixed to and extending downward from an angle bracket 42' fixed to a bar 43 carried by and extending between the tank supporting standards S. The lever at the end opposite to the bifurcated member is pivotally mounted at 44 intermediate the ends of a second lever 45, connected at the end extending beyond lever 40' to one end of a link 46 pivotally connected at the opposite end to an arm 46' fixed to a shaft 47 rotatably carried by the tank supporting standards S to extend parallelly of the fulcrum bar 42. The opposite end of lever 45 extends adjacent to the nozzle member 34 and is curved downwardly to extend at one side of the bifurcated member 39' to a point below said member and has an abutment 45' at the extremity, as shown in full lines in Figure 8, the lever being adapted to have downward movement, as shown in dotted lines 45a, 45b for a purpose to be hereinafter described. The lever 45 is moved to the dotted line positions by rocking movement of the shaft 47 transmitted to said lever and imparted to said shaft by a link 48 (Figures 1 and 2) connected at one end eccentrically to a disk 49 fixed on a drive shaft 50, the opposite end of the link having a connection with a crank arm 51 fixed on the rock shaft 47. The nozzle member is normally urged to position to seat the valve V to close the outlet of the measuring device by a spring 52 attached at one end to the lever 40' and at the opposite end to a part fixed on the tank. The actuation of the valve of each measuring device to open position is controlled individually by a receptacle R on the receptacle supporting shelf 30 in alinement with the nozzle outlet of a measuring device. The rock shaft 47 to which the levers 45 are connected is intermittently rocked thereby raising the end of the levers 45 connected with the links 46. Should there be no receptacle on the supporting shelf 30 in alinement with the measuring device the abutment carrying end of said lever will be moved to the lowermost dotted line position 45a and no movement imparted to lever 40'. Should there be a receptacle in alinement with the nozzle outlet of a measuring device the abutment 45' at the extremity of the lever 45 will engage the top of the receptacle, as shown in dotted lines 45b, thereby arresting the movement of said end of the lever 45 and the continued movement imparted to the opposite end of lever 45 will transmit movement to the lever 40' against the tension of the spring 52 and move the nozzle member 34 outward from the end of the outlet member 32', the valve V moving with said nozzle member by gravity away from the end of the outlet and opening the same to the nozzle orifices 35'. The lever 45 is connected with the lever 40' through a resilient member 54 attached at one end to a side of the lever 40', as at 54', and extended over the upper edge and to embrace the opposite side of said lever, the opposite free end of said member being hooked over the top of lever 45, as shown at 54''. The actuation of the levers 40', 45 is timed to permit of the flow of all of the liquid from a measuring device when the lever 45 is again actuated to the full line position shown in Figure 8 and the lever 40' is actuated by spring 52 to position the nozzle member with the valve in outlet closing position.

The liquid in the tank T is raised or lifted above the inlets to the measuring devices to fill the same into the measuring devices by varying the pressure in the tank. In the arrangement of Figures 1 to 9, inclusive, this is effected by a reduction of pressure in the tank about the inlets to the measuring devices. For this purpose there is provided a bell or hood H engaging over and of a size to provide a space about the open ends of the measuring devices with the opening to the bell immersed in and opening to the liquid in the tank, as shown in Figures 2 and 8, and supported at the open end from the bottom of the tank and spaced therefrom to permit of the free flow of the liquid into the bell. Suitable means may be provided for supporting the bell, and as shown comprises set screws threaded into lugs extended laterally from adjacent the open end of the tank and engaging with or threaded into blocks fixed on the bottom of the tank, as shown at 56 in Figure 8, and whereby the open end of the bell may be variably positioned from the bottom of the tank.

To reduce the pressure or create a vacuum in the bell and thereby effect a raising of the liquid therein above the inlets to the measuring devices suitable vacuum creating means is connected with the bell, and shown as comprising a rotary pump illustrated in a conventional manner at F, driven by a motor M' having a gear drive connection 57 with the pump. The inlet to the pump is connected with the bell by a pipe 58 connected with a valve casing 59 and a pipe 60 connected with the valve casing extended through the side wall of the tank T and connected with the top of the bell. A vacuum is created intermittently in the bell and alternately with the actuation of the discharge valve mechanism of the measuring devices whereby to effect an alternate filling of liquid into the measuring devices and the discharge of the liquid therefrom. For this purpose valve mechanism is provided to alternately connect the vacuum creating means with the bell and open said vacuum creating means and the bell to the atmosphere and destroy the vacuum in the bell.

For this purpose the valve casing 59 is provided with a pair of ports 61, 62 opening to the atmosphere and ports 61', 62' communicating with the connections for the pipes 58, 60 thereto. A two-way valve is mounted in the valve casing, comprising a tapered plug 63 to engage a correspondingly formed seat in the valve casing, the end of the plug of smallest diameter having a threaded stem extended therefrom for the engagement of a nut with a washer interposed between the nut and casing to draw the plug to the valve seat, as at 65'. The plug valve has a pair of ports or passages 64, 65 laterally of each other and extended transversely therethrough, said ports being of arcuate form in longitudinal section and curved oppositely to each other, as shown in Figures 4 and 5. The valve plug is oscillated to alternately place the valve port 65 in communication with ports 61', 62' in the valve casing and thereby connect the vacuum creating means with the bell, and connect said port 65 with the port 62 in the valve casing opening to the atmosphere and the port 62' to open the bell to the atmosphere to destroy the vacuum therein, and connect the port 64 with the port 61 opening from the valve casing to the atmosphere and the port 61' to open the vacuum creating means to the atmosphere, by means actuated by a cam groove in a disk 66 fixed on the drive shaft 50 and comprising a crank arm 67 fixed to a stem 65'' extended axially from the end of the valve plug 63 of largest diameter, the crank arm being operatively connected with and rocked from the cam 66 by a link 68 pivotally connected at one end to the crank arm and carrying a roller to engage and follow the cam groove in the disk 66.

In Figures 10 to 13 there is shown a modified arrangement of the lever mechanism for actuating the valve carrying nozzle member to control the discharge of the liquid from the measuring devices 29. The nozzle device is of the same structure as that shown in Figures 1 to 9, inclusive, except that the valve V is in the form of a ball and in order that the ball shall be maintained in spaced relation to the nozzle head 35 to permit of the discharge of the liquid through the nozzle orifices 35' in the nozzle head a ball support 69 (Figure 13) is provided, said support being in the form of an annulus to engage upon a seat or shoulder formed in the nozzle member 34, as shown at 69' in Figures 10 and 11, the annulus having a series of lugs 70, in the present instance three in number, spaced about and extended radially inward from the inner wall and having the upper surface inclined downward toward the axis for the engagement of the ball and thus supporting the ball to provide a space between the ball and annulus for the passage of the liquid.

Figures 10, 13:
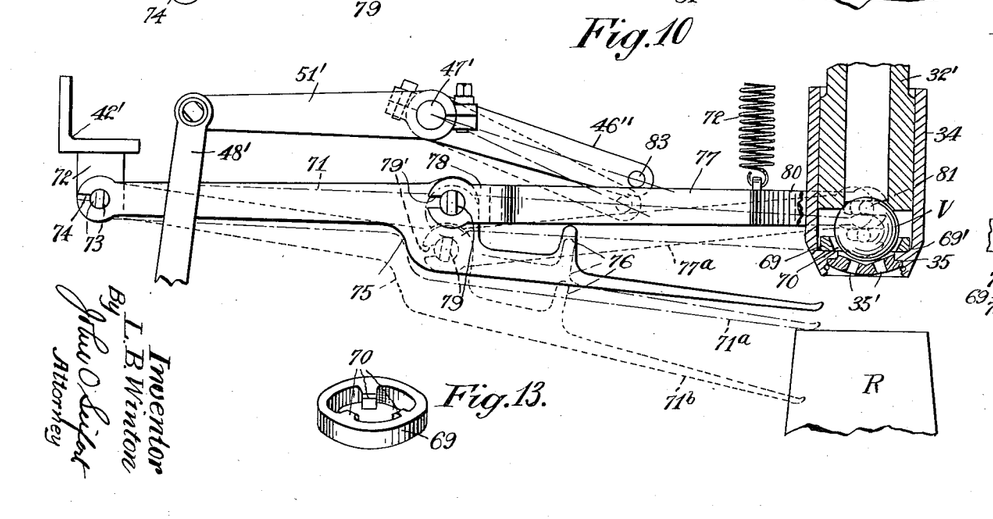
Figure 10 is a side elevation of modified valve actuating means controlled by a receptacle positioned relative to the outlet of the measuring device showing the same in full lines in position with the valve closing the outlet and in dotted lines the positions the parts will assume when the valve is actuated to outlet opening position.
Figure 13 is a perspective view of a valve holder of the valve mechanism shown in Figures 8 to 11, inclusive.

The nozzle member actuating lever mechanism comprises a lever 71 pivotally supported at one end by the angle bracket 42', as on pivots extended laterally from ears 72 extended downwardly from said bracket, the pivot having diametrically opposite portions cut away, as at 73, and the lever having a circular opening with a slot cut through the wall, as at 74, arranged so that when the lever extends at a right angle to the pivot carrying ear 72 the slot will extend at a right angle to the cut-away portions of the pivot, and by adjusting the lever to position at right angles to that shown in Figure 10 the lever may be withdrawn from the pivot through the slot, whereby the lever may be readily dissembled for cleaning purposes. The free end of the lever is offset at substantially a right angle intermediate the ends, as at 75, and said end portion of the lever reduced in width and having a fulcrum lug 76 extended laterally therefrom intermediate the ends in the direction of the right angle offset portion of the lever. The reduced end portion of the lever is of a length to extend into and intercept the plane of a receptacle R on the receptacle support 30 in register with the nozzle outlet. A second lever 77 has a bifurcation 78 at one end the legs of which embrace the opposite sides of the lever 71 at the offset 75 and pivotally connected therewith by a pivot pin 79 fixed in and extended from the opposite sides of the lever 71, diametrically opposite side portions of which pivot pin being cut away to engage a circular opening in the bifurcation legs 78 having a slot cut through the wall thereof, as at 79', for the ready connecting and disconnecting of the levers in a manner similar to the dissembling of the lever 71 on and from its pivot support 73. The lever 77 extends from the lever offset 75 in the plane of the supporting portion of lever 71 and in spaced relation to the reduced end and has a bifurcated portion 80 at said end the legs of which embrace the opposite sides of the sleeve of the nozzle member 34 with recesses extended into the ends for the releasable and pivotal engagement of pins 81 extended diametrically opposite from the nozzle member 34. The spring 72 is connected with the lever 77 to urge the lever to position the nozzle member with the valve V engaging the valve seat in the end wall of the outlet portion 32' of the measuring device and thereby positioning the lever 71 with the abutment 76 engaging the lever 77 and limiting the upward movement of the free end of lever 71. It is to be understood that the pair of connected levers 71, 77 is provided for the nozzle and valve mechanism of each measuring device when more than one measuring device is utilized.

Figure 11:
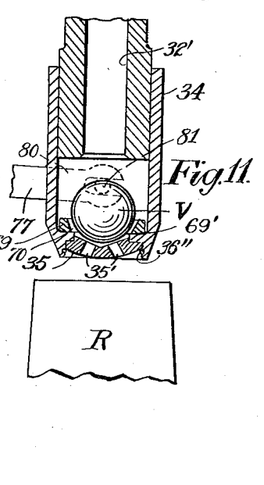
Figure 11 is a sectional view of the valve mechanism shown in Figures 8 to 10 and actuated to outlet opening position when the valve actuating means is actuated to the dotted line positions shown in Figure 10.

To move the nozzle member 34 to unseat the valve from the outlet of a measuring device a rock shaft 47', similar to the rock shaft 47 in the arrangement of Figures 1 to 9, is provided, the shaft being rocked as by a link 48' pivotally connected at one end eccentrically to the axis of a disk, such as the disk 49 on shaft 50, the opposite end of the link being connected to an arm 51' fixed on the shaft 47'. An arm 46'' fixed on the shaft 47' extends therefrom in the direction of lever 77 and positioned slightly at one side thereof, said arm having a pin 83 fixed in and extended laterally therefrom to overhang and engage the lever 77. The levers 71, 77 have in effect a toggle link connection and as shaft 47' is rocked to move the free end of the arm 46'' downward it will move the end of the lever 77 connected with lever 71 downward, the pivot pins on the nozzle member being the fulcrum point of the lever 77, and in effect breaking the toggle and moving the free end of the lever 71 downward and the abutment 76 thereon out of engagement with the lever 77. Should the movement of the free end of the lever 71 be arrested by engagement with a receptacle R positioned relative to a nozzle outlet, as shown at 71a in Figure 10, the pressure of the arm pin 83 on the lever 77 will move said lever against the tension of spring 72 and thereby the nozzle member 34 outward from the outlet of the measuring device and permitting the valve to move by gravity away from and open the outlet, substantially as shown in Figure 11. Should there is no receptacle on the receptacle support relative to a nozzle outlet the free end of lever 71 will be moved to the dotted line position 71b causing the end of lever 77 connected with the lever 71 to assume a dotted line position as shown at 77a, and maintaining the nozzle member in position with the valve engaging the valve seat and closing the outlet from the measuring device. It is to be understood that in the use of a series of measuring devices as shown in Figure 2 when the individual nozzle member actuating means is operated relative to which a receptacle is positioned, any of such nozzles as do not have a receptacle positioned relative thereto will be maintained inoperative to actuate the nozzle valve to open position.

Figures 12, 14:
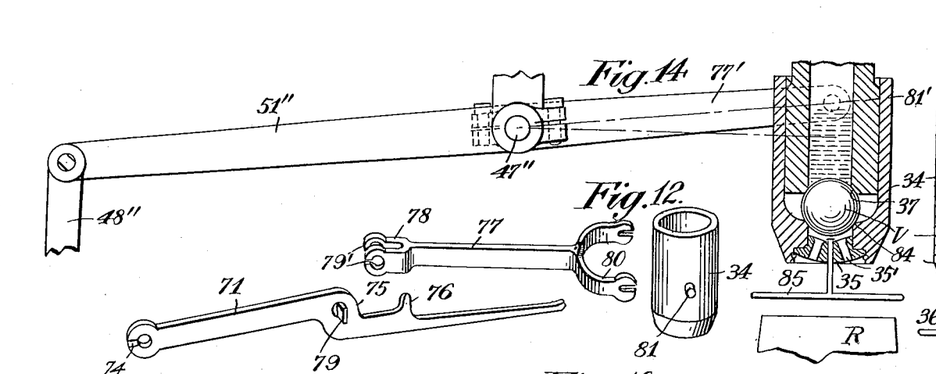
Figure 12 is a perspective view of parts of the valve mechanism and its actuating means shown in Figure 10 and showing the same in dissembled relation.
Figure 14 is a sectional view of a modified arrangement of valve mechanism and the actuating means therefor.
Figures 15, 16:
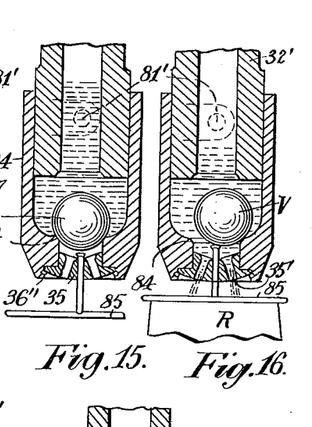
Figures 15 and 16 are sectional views of the valve mechanism shown in Figure 14 and showing the same in different positions.

In Figures 14 to 16, there is illustrated a further modified arrangement of the nozzle member and valve mechanism utilizing a ball valve, as in Figures 10 to 13, inclusive, the nozzle being arranged whereby when the nozzle member is in its normal position with the valve closing the outlet of a measuring device the valve will also function to shut off the nozzle orifices 35' from the nozzle member and maintain the nozzle orifices shut off from the nozzle member when the nozzle member is moved outward from the outlet of the measuring device, as shown in Figure 15. For this purpose the opening in the nozzle member in which the nozzle head is mounted is arranged within the nozzle member with a seat for the valve, as at 84. The nozzle member of each measuring device is moved to outlet opening and closing positions by an arm 77' fixed to a rock shaft 47'', the free end of the arm having a bifurcation the legs of which embrace opposite sides of the nozzle member 34 and have a pivot connection with pins extending diametrically opposite from the nozzle member, as at 81'. The shaft 47'' is rocked in a manner similar to the shaft 47' from the drive shaft 50 by a link 48'' pivotally connected with an arm 51'' fixed on shaft 47'' and the link being connected eccentrically to the disk 49 on the drive shaft 50.

The delivery of the liquid from the measuring devices is also controlled by a receptacle on the receptacle support 30, for which purpose a T-member 85 is slidably mounted by the stem thereof axially in the nozzle heads with the head of the T-members exteriorly and extending transversely of the nozzle heads and normally assuming a position by gravity in spaced relation to the nozzle head with the end of the stem out of engagement with the valve. As the nozzle member is moved toward the receptacle support 30 should there be no receptacle on the receptacle support relative to the nozzle outlet the T-member of said nozzle member will remain in its normal position with the valve seated against the seat 84 and maintaining the outlet of the measuring device closed, as shown in Figure 15. Should there be a receptacle on the receptacle support relative to the nozzle outlet the head of the T-member of said nozzle outlet will engage the top of the receptacle moving the stem of the T-member into the nozzle member and unseating the valve to permit the discharge of the liquid through the nozzle orifices 35'.

In Figures 17 to 22 there is shown a further modified means for actuating the discharge means of the measuring devices controlled by a receptacle on the receptacle support 30 relative to the outlets of such devices. In such arrangement there is utilized the nozzle member 34 and either of the forms of valve mechanism shown in Figures 8, 9 or 10, 11. The nozzle member 34 is supported by and normally urged to position with the valve V engaging the seat about the outlet by springs 86 attached at one end to pins 87 extended laterally and diametrically opposite from the sleeve of the nozzle member 34, the other end of the springs being attached to a fixed part of the measuring device. The nozzle devices are actuated to unseat the valve to open the nozzle outlets by a lever 87' having a pivot support at one end, as from the pivot member 73 extended from the ears 72 of the brackets 42' shown in Figure 10. The opposite end of the lever is provided with a bifurcation extended therefrom and constructed of two members 88 embracing the opposite sides of the nozzle member 34, and each of said members having a pin 88' fixed in and extended outwardly therefrom in parallel and alined relation to the pins 87 carried by the nozzle member. A pair of latches 89 are each arranged at one end with a hook 89' to pivotally engage the pins 88' with the latches extending upward from the bifurcation members 88 and normally urged to assume a position by gravity laterally of the nozzle member and outward toward the ends of the bifurcation members by a bar 90 connected to the latches adjacent the ends opposite the hooks 89', said bar serving as a counterweight to move the latches to said position. Said movement of the latches is limited by the latches engaging blocks 90' fixed to the outer sides of the bifurcation members 88 and extended beyond the end of said members, said blocks also serving to retain the latch hooks 89' on the pins 88', as shown in full lines in Figure 17, the lever 87' being maintained in said position by spring 52'. To move the lever 87' outward from the nozzle member 34 against the tension of spring 52' the means shown in Figure 10 for moving nozzle member 34 to outlet opening position may be utilized, and comprising the arm 46'' fixed to the rock shaft 47' having the pin 83 extended laterally from the free end overhanging and engaging the lever 87', the shaft 47' being rocked by the link 48' connected eccentrically to the disk 49 fixed on the drive shaft 50 and connected to the arm 51' fixed on the rock shaft 47'.

Figures 17, 18, 19, 20, 21, 22:
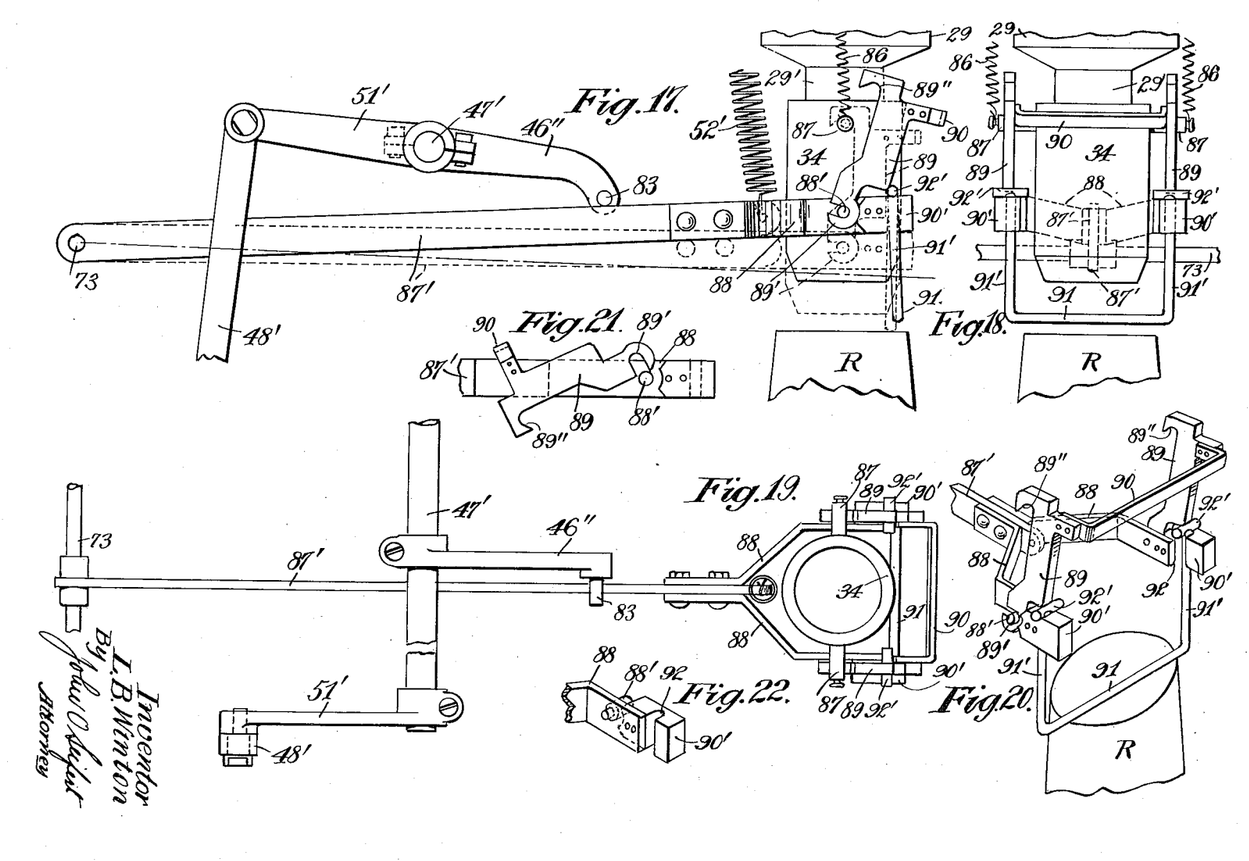

The coupling of the nozzle member 34 to the lever 87' and the movement thereof to outlet opening position is controlled by a receptacle on the receptacle support relative to the outlet means of a measuring device, and comprises a bail member 91 the connecting portion of which extends at a right angle to and at one side of the nozzle outlet and is suspended from the bifurcation members 88 of the lever 87' to have movement transversely thereof by slidably engaging the legs 91' of said member in arcuate transverse guideways in the inner side of the blocks 90' fixed to and extended from the ends of the bifurcation members, as at 92, the end of the legs being bent to extend over and engage with said blocks, as at 92', the bail member 91 normally assuming the position shown in Figures 18 and 20.

Should there be a receptacle on the receptacle support in alinement with the nozzle member as the bifurcated end of lever 87' is moved downward the bail member will engage the top of the receptacle, as shown in dotted lines in Figure 17. By the continued movement of the lever the longitudinal legs due to the engagement of the bail with the receptacle will be moved upward in the block guideways 92, the bent bail supporting ends 92' thereby being moved relative to a bail edge of the latches 89 and move the latches so that a hook portion 89'' at the ends opposite to the hooks 89' will be positioned over the pins 87 extended from the nozzle member, and by the continued downward movement of the lever said hooks 89'' will engage the nozzle pins 87 and couple the nozzle member with the lever so that the nozzle member will participate in the movement of the lever and be moved thereby to the dotted line position shown in Figure 17 to open the discharge outlet of the measuring device. Should there be no receptacle positioned on the receptacle support relative to the outlet of the measuring device the bail with the latches will be moved with the lever relative to the nozzle member 34 in the full line position shown in Figure 17.

The receptacle filling means is adapted to be used in conjunction with means to apply a closure member to the receptacle opening, and for this purpose conveyer means, shown in a general way at 93 in Figures 1 and 2, is provided for transporting the filled receptacles from the receptacle filling means to said receptacle closing means, the filled receptacles being transferred from the shelf 30 to the conveyer in timed sequence with the operation of the receptacle filling and discharging means, said transferring means comprising a slide 94 slidably mounted upon an extension of the shelf 30 below an auxiliary shelf 30' for the storage of receptacles preparatory to placing the receptacles in filling position on the shelf 30. To actuate the transfer slide it is connected by a link 95 with a pivoted lever 95', and said lever actuated by a roller 96 carried by a pivoted lever 97 following a cam groove in a disk 96', the lever 97 being connected with the lever 95' by a link 97'. To render the valve mechanism for the outlet of the measuring devices inoperative the disk 49 may be loosely mounted on the drive shaft 50 and connected to and disconnected from said shaft by clutch mechanism, shown in a conventional manner at 98, actuated by a manually operated lever 99.

In Figure 23 an alternate method and means is illustrated for effecting a raising of the liquid in the tank to above and the filling of the same into the measuring devices. By this method the raising of the liquid is effected by an increase of pressure in the tank. For this purpose the tank has an air tight closure 100 and has a portion T'' of reduced area separated from the main portion of the tank by a partition or wall 101 extended downward between said tank portions to adjacent the bottom and below the normal liquid level in the tank, the two tank portions communicating with each other below said wall. The tank is provided with the float controlled valve connection with a source of supply to maintain the liquid at a predetermined level in the tank and with the measuring devices and actuating means for the discharge means of the Figure 8 arrangement applied thereto. Instead of separating the tank into two compartments as shown, two tanks or containers may be connected in communication with each other adjacent the bottom.

The level of the liquid in the tank is raised above and filled into the inlets of the measuring devices by applying pressure in the tank compartment T'' above the liquid therein, which is effected by pressure creating means comprising a pump or blower, shown in a conventional manner at F', actuated by motor M'' having a gear drive connection 102 with the blower. The pressure is increased in the tank intermittently and alternately with the actuation of the discharge means, whereby to effect an alternate filling of the measuring devices and the discharge of the liquid therefrom. For this purpose the blower is connected with the tank T' through a pipe 103 connected with the blower and a valve casing 104, and the valve casing connected with the tank by a pipe 105. The valve mechanism in casing 104 is of the arrangement illustrated in Figures 4, 5 and 6, whereby the blower and tank are alternately placed in communication with each other and opened to the atmosphere to alternately increase the pressure in the tank.

It will be obvious that various modifications may be made in construction and arrangement of parts without departing from the scope of the invention, and that portions of the invention may be used without others and come within the scope of the invention.

Having thus described my invention, I claim:

1. In a receptacle filling means, a closed tank, a measuring device having an inlet opening to the tank and an outlet exterior of the tank, means to supply and maintain the material in the tank at a level below the inlet of the measuring device, and means operative to intermittently vary the pressure in the tank and thereby raise the level of the material above the inlet to and fill the material from the tank into the measuring device.

2. In means for filling predetermined quantities of material in receptacles, a closed tank, a measuring device having an inlet opening to the tank and an outlet exterior of the tank, means to supply and maintain the material in the tank at a level below the inlet to the measuring device, means intermittently operative to vary the pressure in the tank and thereby raise the level of the material above the inlet to and fill the material from the tank into the measuring device, and means operative alternately with the varying of the pressure and raising of the level of the material within the tank to discharge the material from the outlet of the measuring device.

3. In means for filling predetermined quantities of material into receptacles, a closed tank, a measuring device having an inlet opening to the tank and an outlet exterior of the tank, means to open and close the outlet of the measuring device and normally closing said outlet, means to supply and maintain the material at a level below the inlet to the measuring device in the tank, means intermittently operative to vary the pressure in the tank and thereby raise the level of the material above the inlet to the measuring device and filling of the measuring device with the material from the tank, and means intermittently and alternately operative with the means to vary the pressure and raise the level of the material within the tank to actuate the means to close the outlet of the measuring device to outlet opening position to discharge the material from the measuring device.

4. In means for successively filling predetermined quantities of material into receptacles, a closed tank, a measuring device having an inlet opening to the tank and an outlet exterior of the tank, means to supply and maintain the material at a level below the inlet to the measuring device in the tank, and means operative to intermittently reduce the pressure in the tank and thereby raise the level of the material in the tank above the inlet to and fill the material from the tank into the measuring device.

5. In means for successively filling predetermined quantities of material into receptacles, a closed tank, a measuring device having an inlet opening to the tank and normally closed outlet means exterior of the tank, means to supply and maintain the material at a level below the inlet to the measuring device in the tank, means intermittently operative to reduce the pressure in the tank and thereby effect a raising of the level of the material in the tank above the inlet to and filling of the material into the measuring device from the tank, and means operative intermittently and alternately with the means to reduce the pressure in the tank and filling of the material into the measuring device to actuate the outlet means of the measuring device to discharge the material from the measuring device.

6. In receptacle filling apparatus, a closed tank to contain the material to be filled into receptacles, a measuring device extended upward from the bottom and opening to the tank above the level of the material therein, means to vary the pressure in the tank to effect a raising of the material in the tank and the filling of the measuring device therewith, and means to control the delivery of the material from the measuring device.

7. In receptacle filling apparatus, a closed tank to contain the material to be filled into receptacles, a measuring device extended upward from the bottom of the tank and opening to the tank above the level of the material therein and having normally closed outlet means below the tank, means intermittently operative to vary the pressure in the tank to effect a raising of the material in the tank and the filling of the measuring device therewith, and means intermittently and alternately operative with the pressure varying means to actuate the outlet means to discharge the material from the measuring device.

8. In receptacle filling means, a liquid carrying tank, a cup member extended upward from the bottom and opening to the tank above the level of the liquid therein, and means to intermittently reduce the pressure in the region of the opening to the cup member to effect a raising of the liquid in the tank and filling of the same into the cup member and discharge the liquid from the cup member alternately with the reduction of the pressure and filling of the liquid into the cup member.

9. In receptacle filling means, a liquid carrying tank, a cup member of predetermined capacity extended upward from the bottom and with the upper end open to the tank above the level of the liquid therein, a bell engaged over the open end of the cup member and open to the liquid in the tank, and vacuum creating means connected with said bell intermittently operative to reduce the pressure in the bell and thereby effect a raising of the liquid therein above and filling the same into the cup member.

10. In receptacle filling means, a liquid carrying tank, a cup member having an inlet opening to the tank above the level of the liquid therein and a normally closed valve controlled outlet exterior of the tank, a bell engaged over the cup member and opening to the liquid in the tank, vacuum creating means connected with said bell operative to intermittently reduce the pressure in the bell and thereby effect a raising of the liquid therein to above and filling the cup member with the same, and means to actuate the valve for the outlet of the cup member to open said outlet alternately with the reducing of the pressure in the bell to discharge the liquid from the cup member.

11. In receptacle filling means, a liquid carrying tank, a cup member having an inlet opening to the tank above the level of the liquid therein and a normally closed valve controlled outlet exterior of the tank, a receptacle support below the outlet of the cup member, a bell engaged over the cup member and open to the liquid in the tank, vacuum creating means connected with said bell intermittently operative to effect successive reduction of pressure in the bell and thereby a raising of the liquid therein to above the cup member and the filling of the same with the liquid, and means operative alternately with the vacuum creating means and controlled by a receptacle on the respectacle support to actuate the valve for the outlet of the cup member to open said outlet and discharge the liquid from the cup member to the receptacle.

12. In receptacle filling means, a liquid carrying tank having a connection with a source of supply, means operative by the quantity of liquid in the tank to control the connection of the tank with the source of supply and maintain the liquid at a predetermined level in the tank, a cup member extended upward from the bottom and having an inlet opening to the tank above the level of the liquid therein and a normally closed valve controlled outlet exterior of the tank, a receptacle support below the outlet of the cup member, a bell engaged over the cup member and opening to the liquid in the tank, means connected with said bell operative to effect a successive reduction of pressure in the bell and thereby a raising of the liquid therein above the inlet to the cup member and filling the cup member with liquid, and means operative alternately with said pressure reducing means controlled by a receptacle on the receptacle support to actuate the valve for and open the outlet of the cup member to discharge the liquid from the cup member to the receptacle.

13. In receptacle filling means, a liquid carrying tank, a cup member extended upward from the bottom and having an inlet opening to the tank above the level of the liquid therein and an outlet exterior of the tank, valve mechanism for the outlet of the cup member normally urged to outlet closing position, a receptacle support below the outlet of the cup member, a bell engaged over the cup member and open to the liquid in the tank, means connected with the bell operative to intermittently reduce the pressure in the bell and thereby effect a raising of the liquid therein above the inlet of and fill the same into the cup member, and means actuated intermittently and alternately with said pressure reducing means and rendered operative by the receptacle on the recepetacle support to actuate the valve for the outlet of the cup member to open position to discharge the liquid from the cup member into the receptacle.

14. In receptacle filling means, a pair of closed liquid carrying compartments communicating with each other adjacent the bottom and having a connection with a source of liquid supply, means operative by the quantity of liquid in the compartments to control said connection with the source of supply and maintain the liquid in the compartments at a predetermined level, a measuring device extended upward from the bottom and having an inlet opening to one of said compartments above the level of the liquid therein and a normally closed valve controlled outlet exterior of the compartment, and means connected with the top of the other compartment to increase the pressure upon the liquid therein to cause a rise of the liquid level in the other compartment above the inlet opening to and filling of the liquid into the measuring device.

15. In receptacle filling means, a pair of closed liquid carrying compartments communicating with each other adjacent the bottom and having a connection with a source of liquid supply, means operative by the quantity of liquid in the compartments to control said connection with the source of supply and maintain the liquid in the compartments at a predetermined level, a measuring device extended upward from the bottom and having an inlet opening to one of said compartments above the level of the liquid therein and a normally closed valve controlled outlet exterior of the compartment, means connected with the top of the other compartment operative to intermittently increase the pressure above the liquid in said compartment to cause a rise of liquid level in the first compartment above the inlet opening to and filling of the liquid into the measuring device, and means operative intermittently and alternately with the pressure creating means to actuate the valve to open the outlet of the measuring device to discharge the liquid by gravity therefrom.

16. In receptacle filling means, a pair of closed liquid carrying compartments communicating with each other adjacent the bottom and having a connection with a source of liquid supply, means operative by the quantity of liquid in the compartments to control said connection with the source of supply and maintain the liquid in the compartments at a predetermined level, a measuring device extended upward from the bottom and having an inlet opening to one of said compartments above the level of the liquid therein and a normally closed valve controlled outlet exterior of the compartment, means connected with the top of the other compartment operative to intermittently increase the pressure upon the liquid in said compartment to cause a rise of the liquid level in the first compartment above the inlet opening to and filling of the liquid into the measuring device, a receptacle support below the outlet of the measuring device, and means intermittently operative in timed sequence with the pressure creating means controlled by a receptacle on the receptacle support to actuate the valve of the outlet of the measuring device to open position to discharge the liquid therefrom to the receptacle.

17. In receptacle filling means, a liquid carrying tank, a measuring device having an inlet opening to the tank above the normal level of the liquid in the tank and an outlet exterior of the tank, a valve for the outlet of the measuring device, means to actuate said valve to outlet closing and opening position and normally position the valve in outlet closing position, means operative to intermittently effect a raising of the level of the liquid in the tank above the inlet to the measuring device and filling of the liquid from the tank into the measuring device, a fixed receptacle support below the outlet of the measuring device, means operative in timed sequence with the means to effect a raising of the liquid level in the tank rendered active by a receptacle on the receptacle support in which the liquid is to be filled to actuate the valve to outlet opening position to discharge the liquid from the measuring device into the receptacle.

18. In receptacle filling means, a liquid carrying tank, a cup member extended upward from the bottom of the tank having an inlet opening to the tank above the level of the liquid therein and a normally closed valve controlled outlet exterior of the tank, a bell engaged over and open to the liquid in the tank, vacuum creating means having a connection with the top of the bell to create a vacuum therein and effect a raising of the liquid in the bell above the inlet to the cup member and the filling of the liquid therein, and valve mechanism interposed in the connection of the vacuum creating means with the bell operative to alternatively connect the bell with the vacuum creating means and the atmosphere to intermittently create a vacuum in the bell and filling of the liquid from the tank into the cup member.

19. In receptacle filling means as claimed in claim 18, a receptacle support below the outlet of the cup member, and means controlled by a receptacle on the receptacle support operative alternately with the actuation of the valve to connect the bell with the vacuum creating means to actuate the valve for the outlet of the cup member to open position to discharge the liquid from said member to the receptacle.

20. In receptacle filling means, a liquid carrying tank having a connection with a source of liquid supply arranged with means operative by the quantity of liquid in the tank to control said connection with the source of supply and maintain the liquid at a predetermined level in the tank, a series of cup members extended upward from the bottom of the tank and each cup member having an inlet opening to the tank above the normal level of the liquid therein and a normally closed valve controlled outlet exterior of the tank, a hood engaged over the cup members and open to the liquid in the tank, vacuum creating means operative to alternately create a vacuum in the hood and destroy said vacuum to intermittently effect a raising of the liquid in the hood and filling of the liquid into the cup members, means to support receptacles in register with the outlets of the cup members, means alternately operative in timed sequence with the means to connect the hood with and creating of a vacuum in the hood to actuate the valves of the outlets of the cup members and adapted to be rendered active by receptacles on the support relative to the outlets of the cup members to deliver liquid from the cup members relative to which receptacles are positioned and maintained inactive to actuate the valve of the outlet of a cup member relative to which no receptacle is positioned on the support.

21. Receptacle filling means as claimed in claim 17, wherein the outlet of the cup member is in a reduced portion thereof and arranged with an exterior seat in the end for the valve to seat against, and a carrier for the valve movable to position the valve into and out of engagement with the valve seat.

22. Receptacle filling means as claimed in claim 17, wherein the outlet of the cup member is arranged with an exterior valve seat and the valve has a globose face to engage said valve seat, and a nozzle slidably mounted on the cup member arranged to carry the valve in spaced relation to the nozzle mouth to provide a passage between the valve and nozzle mouth and the nozzle adapted to move the valve into and out of engagement with the valve seat.

23. Receptacle filling means as claimed in claim 17, wherein the outlet of the cup member is provided with an exterior seat for the valve to seat against, a carrier for the valve, a pivoted lever connected with the valve carrier, a spring normally urging the lever to position the valve carrier with the valve engaging the seat, and cam actuated means to move said lever against the tension of the spring to position the valve carrier with the valve out of engagement with the valve seat.

24. Receptacle filling means as claimed in claim 17, wherein the means rendered operative by a receptacle on the receptacle support to move the valve to outlet opening position, comprises a carrier for the valve mounted on the cup member to have movement to move the valve into and out of outlet closing position, a lever having a fulcrum support intermediate the ends connected at one end with the valve carrier, a second lever connected at one end to a rocker and intermediate the ends of which lever the end of the first lever opposite to its connection with the valve carrier is connected, said second lever being adapted to have movement independent of the first lever and transmit the movement thereof to the first lever to move the valve carrier and the valve to outlet opening position, and the free end of the second lever adapted to engage a receptacle on the receptacle support to arrest the movement thereof and thereby transmit movement imparted to the second lever by the rocker to valve opening movement of the first lever, a spring to urge the first lever to move the valve to outlet closing position, and means to normally rock the rocker and thereby actuate the levers.

25. Receptacle filling means as claimed in claim 17, wherein the means rendered operative by a receptacle on the receptacle support to move the valve to outlet opening position, comprises a valve carrier mounted on the cup member to have movement to move the valve to outlet opening and closing positions, an arm having a pivotal fixed support at one end, a second arm having a pivot pin and slot connection with the valve carrier at one end and pivotally connected at the opposite end intermediate the ends of the first arm and the free end of the first arm extending below the second arm adapted to have movement in a vertical plane to intersect the plane of and engage a receptacle on the receptacle support and having a laterally extending abutment to engage the second arm intermediate the ends thereof in the normal position of the arms, a spring connected to the second arm to urge the one end of said arm and the valve carrier to position with the valve in outlet closing position, a rocker one arm of which is adapted to engage the second arm intermediate its connection with the first arm and connection of the spring therewith adapted to transmit movement to said second arm and thereby move the free end of the first arm downward and when said latter arm is arrested by engaging a receptacle on the receptacle support transmit movement to the second arm against the tension of the spring and thereby the valve carrier to move the valve to outlet opening position, and means to intermittently rock said rocker.

26. Receptacle filling means as claimed in claim 17, wherein the valve is in the form of a ball and the outlet of the cup member is arranged with a valve seat, and the means rendered operative by a receptacle on the receptacle support to move the valve to outlet opening position, comprises a nozzle slidably mounted on the cup member to have movement toward and away from the outlet and arranged with a valve seat about the nozzle mouth within the nozzle, and the valve being carried within the nozzle and adapted to be seated against the valve seat about and close the outlet when the nozzle is moved toward the outlet of the cup member and seated against the valve seat about and close the nozzle mouth when the nozzle is moved away from the outlet, means movably carried by the nozzle adapted to engage a receptacle on the receptacle support and thereby move a part of said means within the nozzle to engage and unseat the valve from the valve seat about the nozzle mouth to open communication between the nozzle and outlet of the cup member and delivery of the liquid to the receptacle, and means operative alternately with the means operative to cause a raising of the liquid in the tank to impart reciprocatory movement to the nozzle and move the valve to outlet opening and closing positions.

27. Receptacle filling means as claimed in claim 17, wherein the arm is in the form of a ball and the outlet of the cup member is arranged with a valve seat, and the means rendered operative by a receptacle on the receptacle support to move the valve to outlet opening position, comprises a nozzle slidably mounted on the cup member to have movement toward and away from the outlet and arranged with a valve seat about the nozzle mouth within the nozzle, and the valve being carried within the nozzle and adapted to be seated against the valve seat about and close the outlet when the nozzle is moved toward the outlet of the cup member and seated against the valve seat about and close the nozzle mouth when the nozzle is moved away from the outlet, means movably carried by the nozzle adapted to engage a receptacle on the receptacle support and thereby move a part of said means within the nozzle to engage and unseat the valve from the valve seat about the nozzle mouth to open communication between the nozzle and outlet of the cup member and delivery of the liquid to the receptacle, a pivoted lever pivotally carrying the nozzle by one arm thereof, and means connected to the other arm of the lever operative to rock the lever and thereby reciprocate the nozzle and move the valve to outlet opening and closing positions.

28. Receptacle filling means as claimed in claim 17, wherein the outlet of the cup member is arranged with a valve seat and the valve has a globose surface to engage the valve seat to close said outlet, and the means rendered operative by a receptacle on the receptacle support to move the valve to outlet opening position, comprises a nozzle slidably mounted on the cup member with the nozzle mouth opposed to the outlet and adapted to carry the valve therein in spaced relation to the nozzle mouth to provide a passage between the nozzle mouth and valve and the nozzle normally urged to position to engage the valve with the valve seat and close the outlet and having pins extended diametrically opposite therefrom, a lever having a fixed pivot support at one end and the free end normally urged to predetermined position longitudinally of the nozzle, latch mechanism having a pivot support on said free end of the lever in line with the pins extending laterally from the nozzle adapted to normally assume a position laterally of the axis of the nozzle and adjustable to position to engage the nozzle pins, means to move the latch carrying end of the lever toward the nozzle mouth, and means carried by the lever operative by said movement of the lever adapted to engage a receptacle on the receptacle support and thereby actuated to move the latch mechanism to engage the nozzle pins to couple the lever with and transmit said movement thereof to the nozzle and thereby move the valve to outlet opening position and the delivery of the liquid from the cup member into the receptacle.

29. Receptacle filling means as claimed in claim 17, wherein the valve has a globose surface to engage a seat about the outlet of the cup member, and the means rendered operative by a receptacle on the receptacle support to move the valve to outlet opening position, comprises a nozzle slidably mounted on the cup member carrying the valve in spaced relation to the nozzle mouth, and said nozzle having pins extending diametrically opposite therefrom, springs to urge the nozzle to position with the valve engaging the valve seat and closing the outlet of the cup member, a lever having a fixed pivot support at one end and carrying a yoke member at the opposite end embracing the nozzle, a pair of connected latches having pivot supports on the yoke member at one end and extending upward therefrom and having a hook portion at the upper ends, said pivot supports of the latches extending parallelly of the nozzle pins and the latches normally assuming a position with the hook portions laterally of the nozzle pins and adapted to be positioned with the hook portions to engage the nozzle pins to couple the lever with and transmit the movement thereof to the nozzle and the valve to outlet opening position, a spring to urge the yoke carrying end of the lever to predetermined position inward from the mouth end of the nozzle, means operative alternately with the means to raise the liquid in the tank to move the yoke carrying end of the lever outward from the nozzle mouth, and a yoke member slidably suspended by the legs thereof from the lever yoke, and said yoke member adapted to engage a receptacle on the receptacle support by the movement of the lever and thereby move the legs longitudinally of the latches and cause parts at the extremities to engage and move the latches to engage the hook portions thereof with the nozzle pins and by the continued movement of the lever move the nozzle to position the valve out of engagement with the outlet of the cup member and delivery of the liquid from the cup member to the receptacle.

30. In receptacle filling means, a liquid carrying tank, means for connecting the tank with a source of supply and maintaining the liquid at a predetermined level in the tank, a measuring device having an inlet opening to the tank above the normal level of the liquid in the tank and an outlet exterior of the tank, a valve for said outlet normally positioned to close the outlet, means to intermittently vary the pressure in the tank and thereby cause a rise of the level of the liquid in the tank above the inlet to and the filling of the liquid from the tank into the measuring device, a receptacle support below the outlet of the measuring device, and means actuated in timed sequence with said latter means rendered operative by a receptacle on the receptacle support to move the valve to outlet opening position and the delivery of the liquid from the measuring device to the receptacle.

31. In receptacle filling means, a tank to contain the material to be filled into receptacles, a measuring device having an inlet opening to the tank above the level of the material therein and an outlet exterior of the tank, valve mechanism for controlling the outlet of the measuring device, means to actuate said valve mechanism to outlet opening and closing position and normally maintain the same in outlet closing position, a fixed receptacle support below the outlet of the measuring device, means intermittently operative to fill the measuring device with the material from the tank, and means to actuate the valve mechanism for the outlet of the measuring device to discharge the material therefrom operative intermittently and alternately with the means to fill the material into the measuring device from the tank and controlled by a receptacle on the receptacle support into which the material is to be filled.

LEWIS B. WINTON.